US011988469B2

(12) United States Patent
Colson et al.

(10) Patent No.: US 11,988,469 B2
(45) Date of Patent: May 21, 2024

(54) ADDITIVELY MANUFACTURED PERMEABLE BARRIER LAYER AND METHOD OF MANUFACTURE

(71) Applicant: Hamilton Sundstrand Corporation, Charlotte, NC (US)

(72) Inventors: Paul M. Colson, Westfield, MA (US); Raffi O. Mangoyan, Manchester, CT (US); Alexandru Cadar, Hartford, CT (US); Joshua M. Norman, South Windsor, CT (US); John W. Kowalski, Hadley, MA (US); Thomas James Killen, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 107 days.

(21) Appl. No.: 17/212,718

(22) Filed: Mar. 25, 2021

(65) Prior Publication Data

US 2021/0302109 A1      Sep. 30, 2021

Related U.S. Application Data

(60) Provisional application No. 63/001,782, filed on Mar. 30, 2020.

(51) Int. Cl.
*F28F 9/00*        (2006.01)
*B22F 10/28*     (2021.01)
(Continued)

(52) U.S. Cl.
CPC .............. *F28F 9/001* (2013.01); *B22F 10/28* (2021.01); *B33Y 10/00* (2014.12); *B33Y 80/00* (2014.12); *F28F 17/005* (2013.01)

(58) Field of Classification Search
CPC ........ F28F 9/001; F28F 17/005; F28F 13/003; B33Y 10/00; B33Y 90/00; B22F 10/28
(Continued)

(56) References Cited

U.S. PATENT DOCUMENTS

| 3,469,623 A | 9/1969 | Rawlings |
| 5,038,456 A | 8/1991 | McGarvey |

(Continued)

FOREIGN PATENT DOCUMENTS

| DE | 1117148 B | 11/1961 |
| EP | 2256067 B1 | 1/2013 |

(Continued)

OTHER PUBLICATIONS

Extended European Search Report for EP Application No. 21165052.8, dated Sep. 2, 2021, 9 pages.

(Continued)

*Primary Examiner* — Raheena R Malik
(74) *Attorney, Agent, or Firm* — Kinney & Lange, P.A.

(57) ABSTRACT

A vessel includes first and second portions that are non-permeable to a fluid and a third portion that is permeable to fluid. The first potion defines at least one exterior wall defining an exterior container. The second portion defines at least one interior wall defining an interior container encapsulated by the exterior container. The third portion is positioned between the at least one exterior wall and the at least one interior wall, is integrally formed with the first portion and the second portion, and has a porous structure with non-uniform connected porosity.

14 Claims, 6 Drawing Sheets

(51) Int. Cl.
  *B33Y 10/00* (2015.01)
  *B33Y 80/00* (2015.01)
  *F28F 17/00* (2006.01)

(58) Field of Classification Search
  USPC .......................................................... 165/157
  See application file for complete search history.

(56) References Cited

U.S. PATENT DOCUMENTS

| | | | |
|---|---|---|---|
| 5,167,352 A | 12/1992 | Robbins | |
| 8,069,912 B2* | 12/2011 | Campagna | F28F 13/003 |
| | | | 165/157 |
| 8,905,080 B2 | 12/2014 | Mascarello et al. | |
| 9,746,257 B2* | 8/2017 | Fennessy | B23P 15/26 |
| 10,239,156 B2 | 3/2019 | Gregg et al. | |
| 11,255,614 B2* | 2/2022 | Streeter | B22F 5/106 |
| 2007/0284095 A1* | 12/2007 | Wang | F28D 7/10 |
| | | | 165/165 |
| 2009/0047439 A1 | 2/2009 | Withers et al. | |
| 2010/0147857 A1 | 6/2010 | Huang | |
| 2010/0276121 A1* | 11/2010 | Sagie | F28D 20/02 |
| | | | 165/110 |
| 2011/0247590 A1 | 10/2011 | Donovan | |
| 2014/0251310 A1* | 9/2014 | Muren | F28F 13/003 |
| | | | 165/157 |
| 2016/0199914 A1 | 7/2016 | Potter | |
| 2017/0082372 A1 | 3/2017 | Vos et al. | |
| 2017/0114667 A1 | 4/2017 | Sabo et al. | |
| 2018/0073811 A1* | 3/2018 | Taras | F28F 1/003 |
| 2018/0172368 A1* | 6/2018 | Kowalski | B64D 13/00 |
| 2019/0054535 A1 | 2/2019 | Norton et al. | |
| 2019/0188486 A1 | 6/2019 | Oami | |
| 2019/0299290 A1 | 10/2019 | Kuhns et al. | |
| 2020/0009524 A1 | 1/2020 | Hornung et al. | |
| 2021/0033354 A1* | 2/2021 | Streeter | F28F 1/003 |
| 2021/0071959 A1* | 3/2021 | Streeter | F28F 21/087 |
| 2021/0276087 A1* | 9/2021 | Colson | F28D 9/00 |
| 2021/0302103 A1* | 9/2021 | Colson | F28F 1/003 |
| 2021/0302109 A1* | 9/2021 | Colson | F28F 3/005 |

FOREIGN PATENT DOCUMENTS

| | | |
|---|---|---|
| EP | 3333474 A1 | 6/2018 |
| JP | H01159596 A | 6/1989 |
| JP | 2724169 B2 * | 3/1998 |
| WO | 2009147162 A1 | 12/2009 |

OTHER PUBLICATIONS

1 Communication Pursuant to Article 94(3) EPC for EP Application No. 21165052.8, dated Feb. 13, 2023, 15 pages.

* cited by examiner

US 11,988,469 B2

ADDITIVELY MANUFACTURED PERMEABLE BARRIER LAYER AND METHOD OF MANUFACTURE

CROSS-REFERENCE TO RELATED APPLICATION(S)

This application claims the benefit of U.S. Provisional Application No. 63/001,782 filed Mar. 30, 2020 for "ADDITIVELY MANUFACTURED PERMEABLE BARRIER LAYER AND METHOD OF MANUFACTURE" by P. Colson, R. Mangoyan, A. Cadar, J. Norman, J. Kowalski, and T. Killen.

BACKGROUND

The present application relates generally to additively manufactured heat exchangers and, more particularly, to barrier layer passages for leak mitigation.

Barrier layers are often required to isolate fluids in a pressure vessel in the event of leakage. Conventional "double wall" configurations provide a gap between inner and outer vessels, which can isolate a leak and provide a pathway for drainage. Such configurations are not ideal for applications requiring maximum heat transfer between the interior and exterior surface of the pressure vessel (e.g., heat exchangers) as the empty volume between walls acts as an insulating thermal barrier.

Practical limitations of traditional manufacturing methods create limited geometry, shape, and arrangement of internal features in components such as heat exchangers. These limitations can constrain thermal energy transfer and fluid flow performance in the heat exchanger. Additionally, the ability to handle high pressures, temperatures, and their associated transient conditions can be diminished.

SUMMARY

In one aspect, a vessel includes first and second portions that are non-permeable to a fluid and a third portion that is permeable to fluid. The first potion defines at least one exterior wall defining an exterior container. The second portion defines at least one interior wall defining an interior container encapsulated by the exterior container. The third portion is positioned between the at least one exterior wall and the at least one interior wall, is integrally formed with the first portion and the second portion, and has a porous structure with non-uniform connected porosity.

In another aspect, a heat exchanger includes an exterior container formed by an exterior wall, an interior container formed by an interior wall with the interior container being disposed within the exterior container such that the exterior container encapsulates the interior container, a plurality of sections disposed in a stacked arrangement with each section including a portion of the interior container and a portion of the exterior container, and a permeable portion disposed between and formed integrally with the exterior wall and the interior wall. The permeable portion has a porous structure having non-uniform connected porosity.

In yet another aspect, a method of additively manufacturing a vessel having a permeable portion includes forming a first wall defining an exterior container, forming a second wall spaced apart from the first wall and defining an interior container such that the interior container is encapsulated by the exterior container, and forming a permeable portion disposed between and connecting the first and second walls. Forming the permeable portion includes fusing powdered material by melting and solidifying the powdered material in a plurality of first regions to provide dense non-permeable first regions, and fusing powdered material by sintering the powdered material in a second region surrounding and connected to the plurality of first regions to provide a porous second region having an open volume of surface connected porosity between 1 percent and 50 percent and providing fluid permeability in multiple directions.

The present summary is provided only by way of example, and not limitation. Other aspects of the present disclosure will be appreciated in view of the entirety of the present disclosure, including the entire text, claims, and accompanying figures.

Figure 1:
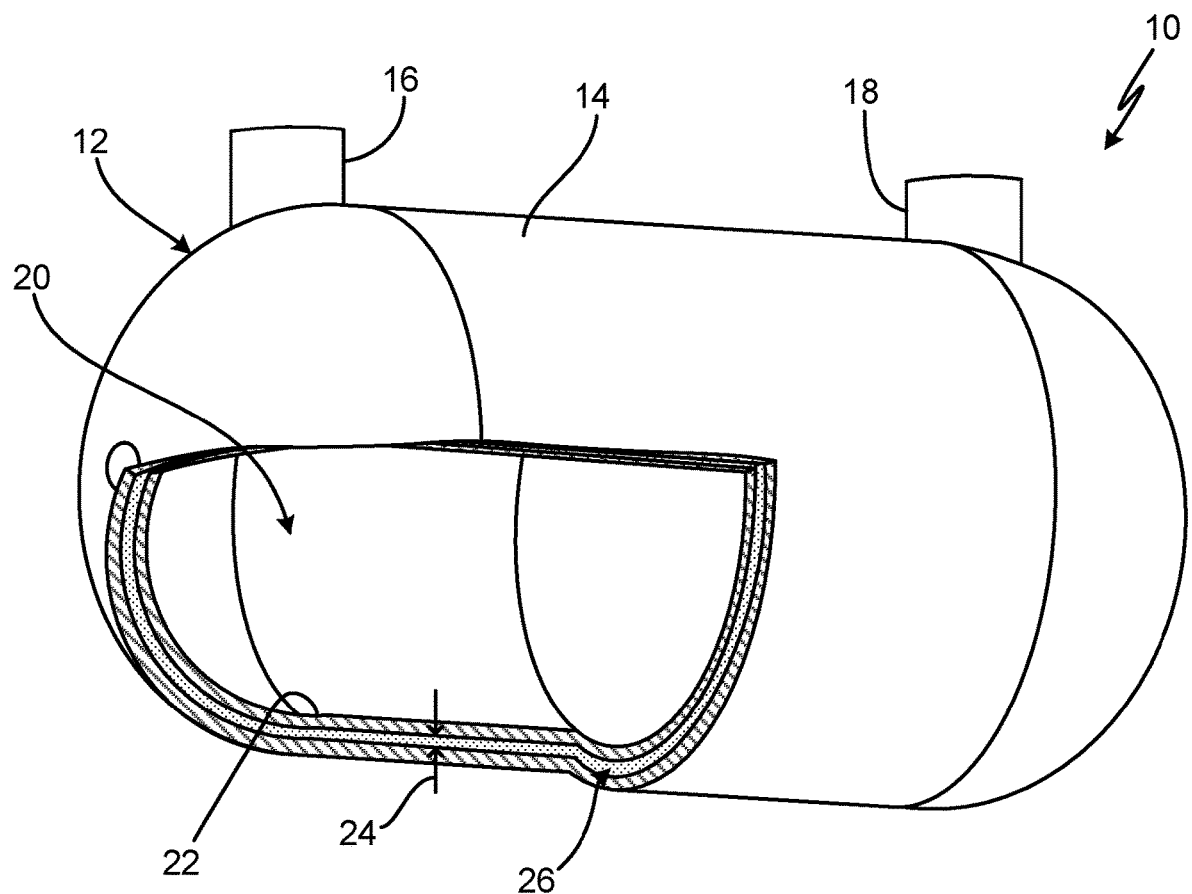
FIG. 1 is an isometric partial cross-section view of a pressure vessel with a permeable barrier layer.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

FIG. 1 is a perspective partial cross-section view of pressure vessel 10 and shows exterior container 12, (with exterior wall 14), inlet 16, outlet 18, interior container 20 (with interior wall 22), gap 24, and permeable portion 26.

Pressure vessel 10 is a container configured to hold a pressurized fluid or fluids. In this example, pressure vessel 10 is configured as a double-wall pressure vessel. Pressure vessel 10 can be a reactive fluid heat exchanger. Exterior container 12 and interior container 20 are enclosed capsules. Exterior wall 14 and interior wall 22 are curved sheets of solid material. In this example, exterior wall 14 and interior wall 22 include cylindrical shapes with rounded ends. Inlet 16 and outlet 18 are fluidic ports. Exterior wall 14 and interior wall 22 are spaced apart. Gap 24 is a space separating exterior wall 14 from interior wall 22. Permeable portion 26 is disposed in gap 24 and extends from exterior wall 14 to interior wall 22. Permeable portion 26 is a porous structure with non-uniform connected porosity and forms a permeable barrier layer between exterior and inertior walls 14 and 22.

In one example, pressure vessel 10 can be disposed in an aircraft and/or fluidly connected to a fluid management system of the aircraft, such as an air cycle machine or an environmental control system. Exterior container 12 contains or encapsulates interior container 20, gap 24, and permeable portion 26. Exterior wall 14 is disposed outward of interior wall 22 and is integrally formed together with permeable portion 26 via layer-by-layer additive manufacturing. Inlet 16 and outlet 18 are disposed in different portions of exterior wall 14. Inlet 16 and outlet 18 extend into pressure vessel 10 and connect to interior wall 22 such that inlet 16 and outlet 18 fluidly connect an interior cavity of interior container 20 to an ambient environment external to pressure vessel 10. Interior container 20 is disposed and mounted within exterior container 12. Interior wall 22 is disposed inside of exterior wall 14 and is integrally connected to permeable barrier layer 26 via layer-by-layer additive manufacturing. Gap 24 extends between exterior wall 14 and interior wall 22. Permeable barrier layer 26 is disposed in gap 24 and is integrally connected to exterior wall 14 and interior wall 22 via layer-by-layer additive manufacturing.

In this exemplary embodiment, pressure vessel 10 is a heat exchanger configured to transfer thermal energy to/from a first fluid inside of interior container 20 from/to a second fluid outside of exterior container 12. Pressure vessel 10 and its components are produced via layer-by-layer additive manufacturing such that every component of pressure vessel 10 is integrally formed together as a single piece of material. Exterior container 12 and interior container 20 contain and/or encapsulate a fluid or fluids. Exterior wall 14 provides an outer barrier of external container 12 and is configured to prevent transmission of a fluid across exterior wall 14. Exterior wall 14 is non-permeable to fluids. Inlet 16 receives a fluid from outside of pressure vessel 10 and transports the fluid into interior container 20. Outlet 18 transports the fluid from inside of interior container 20 to outside of pressure vessel 10. In one example, inlet 16 and/or outlet 18 can be fluidly connected to a component or components of the environmental control system or another engine component of the aircraft.

Interior wall 22 is a structural wall that serves as an inner fluid barrier of interior container 20. Interior wall 22 is non-permeable to fluids. Permeable portion 26 provides a fluid flow path in the case of a leak of a fluid from either exterior wall 14 or interior wall 22 into gap 24. Permeable portion 26 provides a safety mechanism to prevent mixing of reactive fluids. In this example, permeable portion 26 provides a flow path for any fluid that leaks into gap 24 either through interior wall 22 or exterior wall 14. Permeable portion 26 provides structural support and thermal energy conduction between exterior wall 14 and interior wall 22. In this example, permeable portion 26 can be used to maximize thermal conduction.

Permeable portion 26 is produced by layer-by-layer additive manufacturing as described in further detail below. Permeable portion 26 is designed to be formable via layer-by-layer additive manufacture construction without any requirement of separate or dedicated support structures during the build process, and without necessitating the removal of powder during or after manufacture of pressure vessel 10. The density and pore structure or pore size of permeable portion 26 can be selected based on associated structural loading of pressure vessel 10. Permeable portion 26 can serve as a leakage barrier passage. Permeable portion 26 can accommodate rupture of interior wall 22 containing a higher pressure fluid and leakage of the fluid into gap 24 without failure of pressure vessel 10 and leakage through exterior wall 14. Permeable portion 26 can be routed to collection points (not shown) to allow for collection and detection of fluid leakage into permeable portion 26. The detection of fluid from permeable portion 26 can indicate a need for replacement or repair of pressure vessel 10.

Pressure vessel 10 with permeable portion 26 can provide a lightweight means for routing a leak to a safe location while still providing conductive heat transfer between exterior wall 14 and interior wall 22 of pressure vessel 10. Permeable portion 26 acts as a thermal load carrying element to improve heat transfer between exterior wall 14 and interior wall 22. Permeable portion 26 can be designed to maximize thermal load carrying while also limiting structural and thermal stresses across pressure vessel 10. Permeable portion 26 remains dense enough to act as a structural load carrying member and permeable enough to allow a flow of fluid through gap 24.

The design of permeable portion 26 can be tuned to meet varying requirements for structural support and thermal conduction in different locations of pressure vessel 10. Density and pore structure or pore size of permeable portion 26 can be varied depending a location of permeable portion 26 in pressure vessel 10 to accommodate varying pressure and thermal differentials. Density can be increased to increase stiffness and heat transfer. Density can be reduced to provide flexibility to accommodate pressure and/or thermal loads. Density and pore structure of permeable portion 26 can be tuned to meet performance criteria or operational parameters of pressure vessel 10, as explained in further detail below. Specifically, density and pore structure of permeable portion 26 can be controlled locally to optimize the overall structural integrity and heat transfer capability of pressure vessel 10. Permeable portion 26 can be tuned to provide locally optimized thermal energy transfer between fluids and locally optimized structural integrity. Additionally, permeable portion 26 can designed to reduce overall weight of pressure vessel 10 (for weight sensitive applications).

In one example, a methodology for defining the structure of permeable portion 126 can include an iterative cycle and the use of a multi-physics analysis model. In such an example, a baseline model can be analyzed by utilizing computational flow dynamics and/or finite element analysis to calculate the associated global stresses created from the associated loads (e.g., temperature deltas between the first and second fluids, an external skin surface temperature of the heat exchanger, temperature transients, pressure deltas between interfacing fluids, mounting loads, etc.). Permeable portion 26 can be designed based on the associated stresses and deformation of the pressure vessel 10 as well as the performance, packaging, and life requirements for pressure vessel 10. Due to the number of variables and complex loading for which the permeable portion 26 is being tuned, certain requirements can be prioritized.

The use of additive manufacturing to produce permeable portion 26 together with pressure vessel 10 can reduce manufacturing time of pressure vessel 10 and potential leak paths. Additively manufacturing pressure vessel 10 and permeable portion 26 as one integral piece of material eliminates the need for joining various sub-components through welding, brazing, or other joining methods and thereby eliminates the presence of potential leaks paths at joining seams.

The weight of pressure vessel 10 can be reduced with the incorporation of permeable portion 26 between exterior wall 14 and interior wall 22. A thickness of one or both exterior wall 14 and interior wall 22 can be reduced due to the structural load carrying capability of permeable portion 26.

Geometries of pressure vessel 10 and of permeable portion 26 can be contoured and conformal to meet packaging needs and can be optimized based on structural loading requirements of pressure vessel 10. Gap 24 with permeable portion 26 can be carried or transitioned through associated piping (e.g., inlet 16 and outlet 18) and headers without the added weight and/or complexity of multiple components. Likewise, dimensions of gap 24 and permeable portion 26 can be varied depending on the required flow rate(s) and pressure of the fluid in specific areas of pressure vessel 10. Permeable portion 26 also provides improved thermal energy transfer between fluid internal and external to pressure vessel 10. For example, a conduction path between exterior container 12 and interior container 20 is improved compared to traditional designs without permeable portion 26.

Figure 2A:
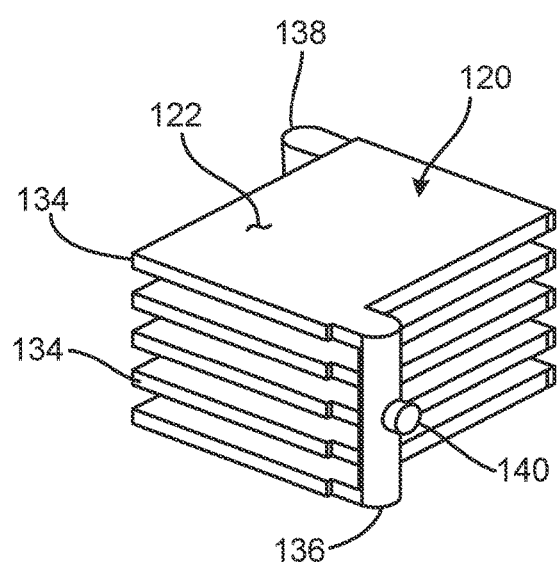
FIGS. 2A and 2B are isometric views of interior and exterior walls, respectively, of a heat exchanger.
Figure 2B:
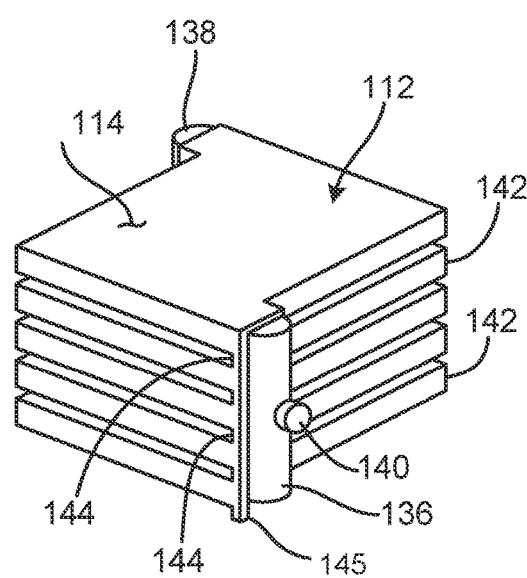

FIG. 2A is a perspective view of interior container 120 and shows interior wall 122, sections 134, first header 136, second header 138, and port 140. FIG. 2B is a perspective view of exterior container 112 and shows exterior wall 114, sections 142, connections 144, and drain port 145. FIGS. 2A and 2B are herein discussed together.

In this example, interior container 120 is an interior container of a heat exchanger. Interior wall 122 is an external surface of interior container 120. Sections 134 are levels or discrete planar portions of interior container 120. First header 136 and second header 138 are conduits configured to direct a flow of a fluid. Port 140 is a tube or orifice in first header 136. Exterior container 112 is an external container of the heat exchanger. Exterior wall 114 is an external surface of external container 112. Sections 142 are levels or discrete planar portions of exterior container 112. Connections 144 and drain port 145 are channels.

In FIG. 2A, interior container 120 is shown in isolation. In FIG. 2B, interior container 120 is shown as disposed inside of exterior container 112. Interior wall 122 wraps and extends around interior container 120 to form an external fluidic barrier of interior container 120. Sections 134 of interior container 120 are disposed in a stacked arrangement and are in fluid communication with each other via first and second headers 136 and 138. First header 136 and second header 138 are disposed on opposite corners of interior container 120. Both first header 136 and second header 138 are connected to and in fluid communication with each of sections 134. Port 140 is mounted onto and fluidly connected to first header 136. In another example, there can be a second corresponding port similarly situated on second header 138. Exterior container 112 surrounds and contains interior container 120. Exterior wall 114 surrounds and contains interior wall 122 of interior container 120. Sections 142 of exterior container 112 are disposed in a stacked arrangement similar to sections 134 of interior container 120. Connections 144 extend between and fluidly connect adjacent sections 142 of external container 112. Drain port 145 is disposed on a bottom corner of exterior container 112. Drain port 145 is fluidly connected to an internal cavity of exterior container 112 formed by exterior wall 114. interior container 120 and exterior container 112, thermal energy is transferred across interior wall 122 and exterior wall 114 between the first and second fluids.

In an instance where the first fluid or the second fluid leaks into the space or gap between interior wall 122 and exterior wall 114, connections 144 provide a fluidic pathway by which the leaked fluid can travel through and towards drain port 145. Once the leaked fluid reaches drain port 145, the fluid can be withdrawn, detected, and/or sensed to indicate the presence of a leak.

Figure 3:
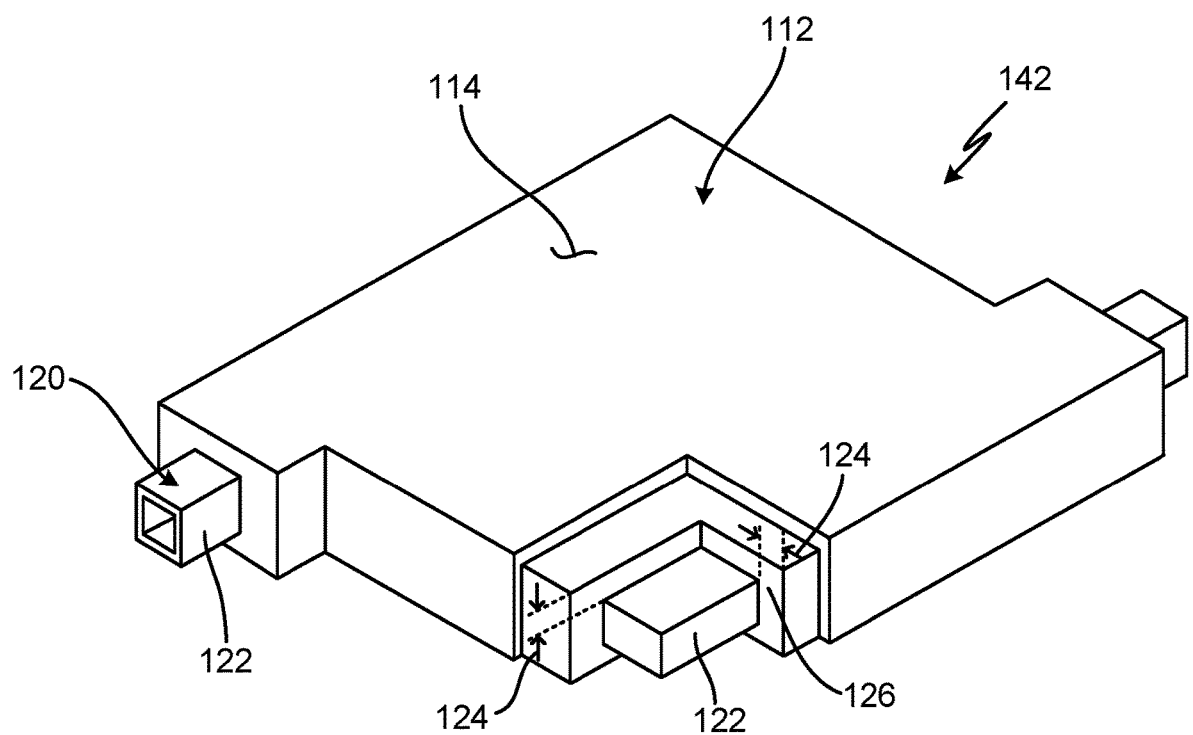
FIG. 3 is an isometric view of a single section of the heat exchanger and includes a cut-out showing a permeable barrier layer between interior and exterior walls.

FIG. 3 is a perspective view of a single section 142 of the stack of sections 142 and shows exterior container 112, exterior wall 114, interior container 120, interior wall 122, gap 124, and permeable portion 126. FIG. 3 shows a portion of exterior wall 114 cut-away to show gap 124 and permeable portion 126. In this example, section 142 is one of sections 142 shown in FIG. 2B.

Gap 124 extends between interior wall 122 of interior container 120 and exterior wall 114 of exterior container 112. In this example, gap 124 is a barrier passage of a heat exchanger. Permeable portion 126 is disposed in gap 124. Permeable portion 126 is a porous structure with non-uniform connected porosity as described in further detail below.

In this example, exterior wall 114 forms an enclosed container that encases interior container 120 and permeable portion 126. Permeable portion 126 forms a flow path envelope surrounding interior container 120. Permeable portion 126 is in fluid communication with drain port 145 via connections 144 (see e.g., drain port 145 and connections 144 in FIG. 2B). Permeable portion 126 is connected to and integrally formed with exterior wall 114 and interior wall 122 via layer-by-layer additive manufacturing.

Permeable portion 126 can accommodate complex loading, including both structural and thermal loading between exterior container 112 and interior container 120. Interfacing fluid channels typically contain fluids at varying pressures as well as varying temperatures and transients related to the structural and thermal loads. In this example of a rectangular heat exchanger where the channels containing two different fluids are stacked on top of one another, there can be differential expansion and deformation that varies in the x, y and z direction of both exterior wall 114 and interior wall 122. When the first fluid is at a very low temperature and the second fluid in an interfacing channel is at a high temperature, differential thermal expansion occurs creating significant mechanical stress in the structure(s) between them. Other loads such as varying pressures or rapid thermal transients can similarly develop.

In this example, permeable portion 126 is positioned between the two fluids. Permeable portion 126 functions as a structural element of the heat exchanger as well as a thermal energy conductor. The design of permeable portion 126 can be tuned to meet varying requirements for structural support and thermal conduction in different locations of section(s) 142. Density and pore structure of permeable portion 126 can be varied depending a location of permeable portion 126 in the heat exchanger to accommodate varying pressure and thermal differentials. Density and pore structure of permeable portion 126 can be based on direct relationship between interfacing fluid channels, distance from headers (e.g., first and second headers 136 and 138), distance from mounting connections, distance from fluid inlets and exits (e.g., port 140), and distance from heat exchanger walls. For example, a location of the heat exchanger having a large thermal delta may require reduced stiffness (increased flexibility) to allow the heat exchanger to deform due to thermal expansion and thereby reduce stress. In some embodiments, headers 136, 138 can require maximum flexibility to accommodate twisting, deformation, and deflection due to thermal expansion. Reduced stiffness can be provided by increasing porosity and/or pore size of permeable portion 126. Locations of heat exchanger having a large pressure delta can require increased stiffness. Density of permeable portion 126 can be increased to provide increase stiffness. Density of permeable portion 126 can also be increased to increase heat transfer. Density can be increased in locations of the heat exchanger where maximum heat transfer is desired (i.e., heat exchanger core). Density of permeable portion 126 can be increased without compromising permeability of permeable portion 126. Density and pore structure of permeable portion 126 can be adjusted to provide stiffness and support to other structural elements in reacting to the pressure load and high heat transfer in one area but can incorporate reduced stiffness in an area of high thermal load to accommodate deformation caused by thermal expansion.

In one example, density and pore structure of permeable portion 126 can be tuned to meet performance criteria or operational parameters of the heat exchanger. Density and pore structure of permeable portion 126 can be controlled locally to optimize the overall structural integrity and heat transfer capability of the heat exchanger. Permeable portion 126 can be tuned to provide locally optimized thermal energy transfer between fluids and locally optimized structural integrity. Additionally, permeable portion 126 can designed to reduce overall weight of the heat exchanger (for weight sensitive applications).

In one example, a methodology for defining the structure of permeable portion 126 can include an iterative cycle and the use of a multi-physics analysis model. In such an example, a baseline model can be analyzed by utilizing computational flow dynamics and/or finite element analysis to calculate the associated global stresses created from the associated loads (e.g., temperature deltas between the first and second fluids, an external skin surface temperature of the heat exchanger, temperature transients, pressure deltas between interfacing fluids, mounting loads, etc.). Permeable portion 126 can be designed based on the associated stresses and deformation of the heat exchanger as well as the performance, packaging, and life requirements for the heat exchanger. Due to the number of variables and complex loading for which the permeable portion 126 is being tuned, certain requirements can be prioritized. For example, permeable portion 126 may be designed to reduce stiffness at the expense of increased thermal energy transfer in order to improve the life of the heat exchanger. For example, permeable portion 126 can have an increased porosity in a location of the heat exchanger having high thermal load. While the increase porosity provides flexibility, it may also reduce thermal energy transfer as pathways for thermal conduction are disrupted by pores.

Figures 4A, 4B, 4C:
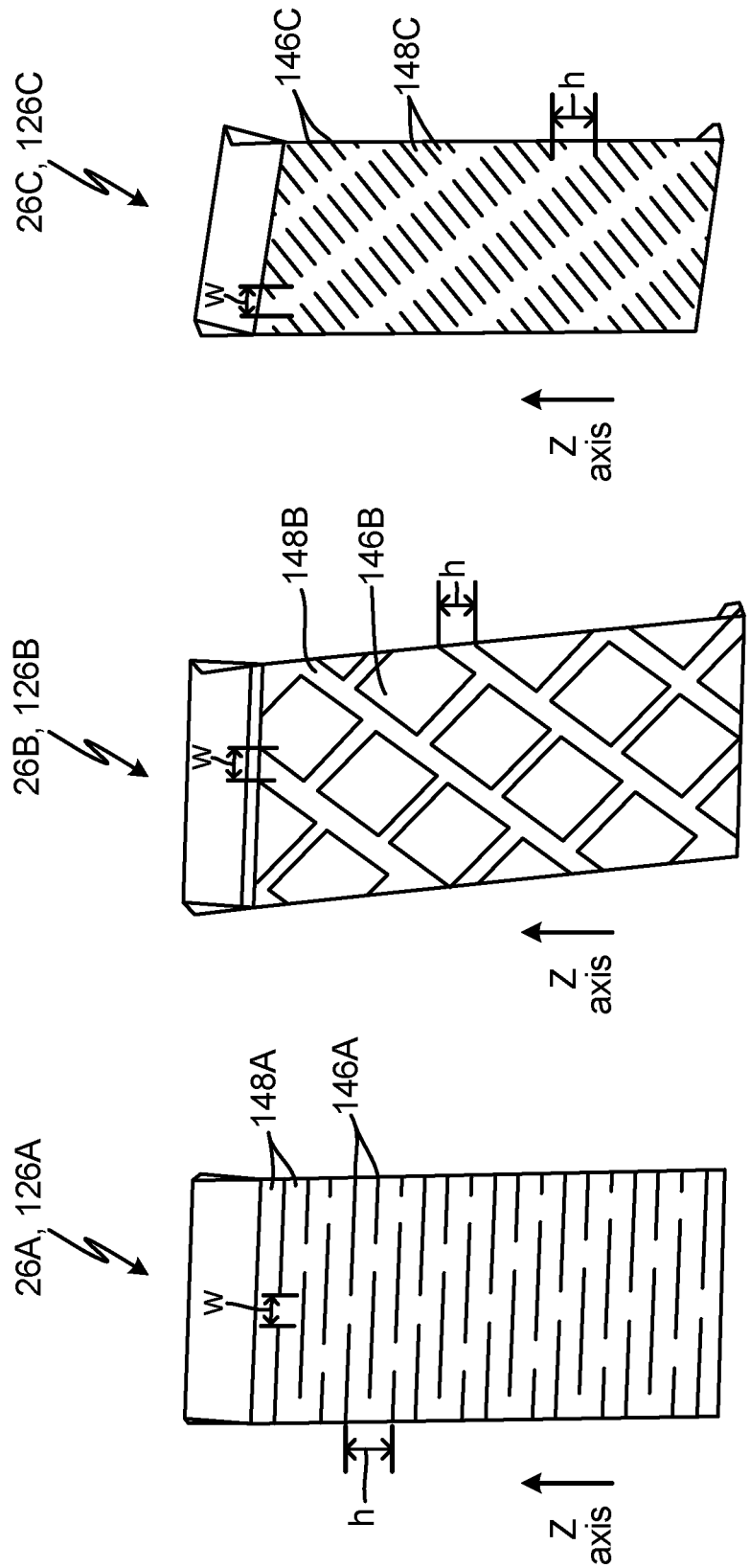
FIGS. 4A-4C are cross-sectional side views of permeable barrier layers including permeable regions and dense regions.
Figure 5:
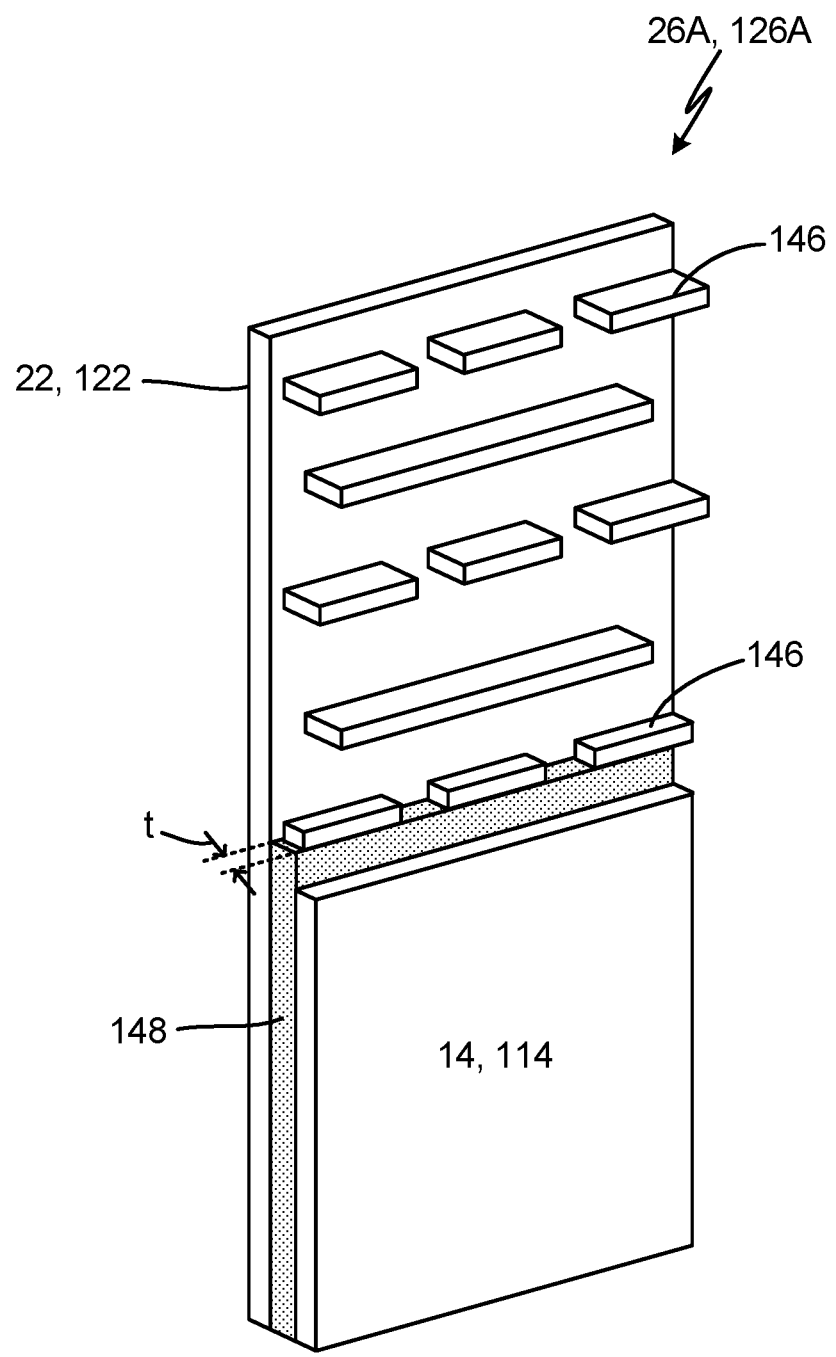
FIG. 5 is an isometric view of the permeable barrier layer of FIG. 4A disposed between interior and exterior walls and includes a cut-out to show the permeable and dense regions.
Figure 6:
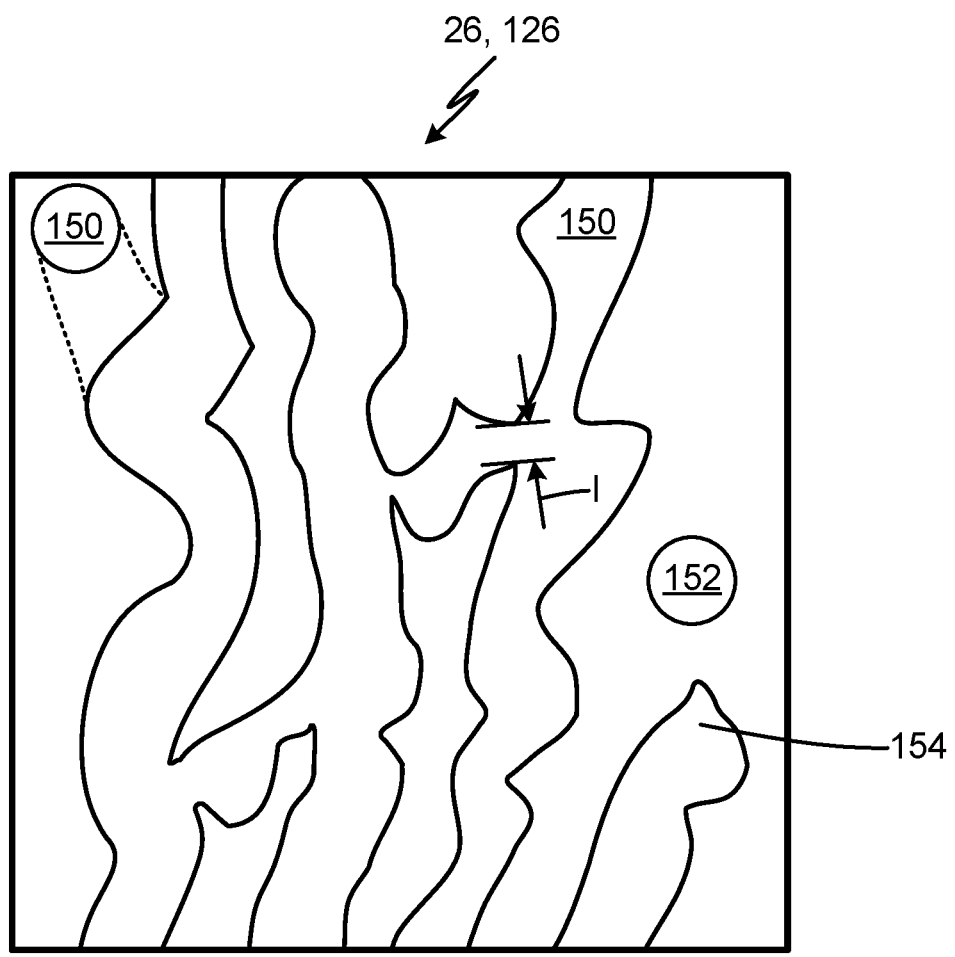
FIG. 6 is an enlarged cross-sectional view of a permeable region of any of the permeable barrier layers of FIGS. 4A-4C.

FIGS. 4A-4C are cross-sectional side views of differing embodiments of permeable portion 26, 126 of FIGS. 1 and 3. FIG. 5 is an isometric cross-sectional view of permeable portion 26A, 126A of FIG. 4A. FIGS. 4A-4C and 5 illustrate permeable regions 146 and dense regions 148 of permeable portion 26, 126. FIG. 5 illustrates walls of pressure vessel 10 (i.e., exterior wall 14 and interior wall 22) of FIG. 1 and, alternatively, walls of section 142 (i.e., exterior wall 114 and interior wall 122) of the heat exchanger of FIG. 2B between which permeable portion 26, 126 is disposed. FIG. 6 is an enlarged cross-sectional representation of any of permeable regions 148 illustrated in FIGS. 4A-4C. FIGS. 4A-4C, 5, and 6 are discussed together.

Pressure vessel 10 of FIG. 1 and the heat exchanger of FIGS. 2A, 2B, and 3 can be formed via layer-by-layer laser powder bed fusion additive manufacturing. Exterior walls 14, 114, interior walls 22, 122, and permeable portions 26, 126 can be integrally formed via layer-by-layer additive manufacturing. Permeable portion 26, 126 can be formed through adjustment of specific parameter controls (e.g., energy density, raster speed, laser beam spot size, etc.) during fabrication. Permeable portion 26, 126 can be formed without the requirement of support structures during the build process and without requirement for removing powder during or after manufacture.

Laser powder bed fusion is an additive manufacturing process in which three-dimensional (3-D) objects are produced from powder in a layer-by-layer fashion directly from a digital model. All powder or selective regions of powder in a powder layer can be fused by melting or sintering with a laser as the heat source. Although the present invention is directed particularly to a laser powder bed fusion process, it will be understood by one of ordinary skill in the art that the disclosed method can applied to other powder bed fusion processes, including but not limited to electron beam melting.

In laser powder bed fusion, a layer of powder is spread over a build platform in an even layer. A laser and scanning mirror are activated to direct a laser beam over the build platform to melt and fuse selected areas of powder to form solidified areas in a layer of a component and to attach the solidified areas to an underlying layer of the component according to a 3-D computer model of the component and process stored in a memory file. For each layer, the build platform indexes downward and a new layer of powder is evenly spread by a re-coater over the surface of the build platform containing the selectively solidified areas. The laser and scanning mirror are again activated and selected areas of the deposited powder are fused together and to the underlying layer according to the cross-section of the digital model of the component and process stored in the memory file. The process is repeated until the solid component is completed.

Exterior walls 14, 114 and interior walls 22, 122 can be formed by melting and solidifying selected regions of powder to form dense regions that are not permeable to fluids. Densities of 99.5% or greater (porosities of 0.5% or less) can be achieved using conventional laser bed powder fusion methods. An example of processing parameters, including laser power, laser spot size, and scanning strategy, used to form dense regions according to the present invention are provided below for two powder compositions.

Permeable portion 26, 126 is characterized by connected porosity that can be introduced in a powder layer by fusing selected regions by sintering or partially melting and solidifying the powder. The terms "sintering" and "partially melting and solidifying" are used interchangeably herein to refer to a fusing process in which the powder particles are fused but the bulk of the powder is not fully melted thereby leaving pores between powder particles. The powder is consumed in this process such that little to no residual, unfused, powder remains, while pores between some adjacent powder particles remain open. The pores can be interconnected within a single layer and with underlying and overlying layers thereby providing permeability in multiple directions through permeable portion 26, 126 (see FIG. 6). Pore size, structure, and interconnectivity can vary within and between each layer thereby providing permeable portion 26, 126 with non-uniform connected porosity. In lieu of complex modeling, processing parameters can be adjusted to form permeable regions 148. As discussed further below, the energy density of the laser can be decreased to allow only partial melting or sintering of the powder. In essence, the process relies on the stochastic production of defects—a practice generally avoided in additive manufacturing methods, but which has been shown in the present invention to provide stable connected porosity or a permeable structure having high structural integrity. Because permeable portion 26, 126 is not limited by size requirements of complex geometrical structures, a thickness of permeable portion 26, 126 is limited only by a diameter of the laser beam. Generally, permeable portion 26, 126 can have a thickness equal to or greater than the diameter of the laser beam. The disclosed method can be used to generate permeable portion 26, 126 in small volumes (e.g., 0.005 inches to 0.25 inches (0.127 mm to 6.35 mm)) where current lattice or similar structures cannot be formed.

Permeable portion 26, 126 can include both dense and permeable regions 146, 148. All dense regions 146 can be formed using a first energy density, defined by a first set of processing parameters, and all permeable regions 148 can be formed using a second energy density lower than the first energy density and defined by second set of processing parameters that differs from the first set. A 3-D model of the component includes the defined geometry and associated first set of processing parameters for forming dense regions, and defined geometry and associated second set of processing parameters for forming permeable regions. The geometric arrangement of dense and permeable regions within each layer can be designed to limit surface swelling during building and re-coater blade contact. All dense regions within a build layer can be formed in succession and all permeable regions can be formed in succession, such that each set of first and second processing parameters are adjusted only once during formation of a single layer.

As used herein, energy density is defined as $P/(V*H*S*T)$, where P is the power of the laser (measured in Watts), V is scan velocity (measured in mm/s), H is hatch spacing (measured in mm), S is laser beam spot size (diameter, measured in mm), and T is layer thickness (measured in mm). The laser power, scan velocity, laser spot size, hatch spacing, and layer thickness are processing parameters of the first and second sets of processing parameters. Layer thickness is uniform for each layer and, therefore, does not vary between dense and permeable regions 146, 148, however, can vary between layers. Any one or each of laser power, scan velocity, hatch spacing, and laser spot size can be varied between dense and permeable regions 146, 148 to increase and decrease energy density, respectively. For example, laser spot size and/or scan velocity can be increased to allow for only partial melting or sintering of powder in permeable regions.

FIGS. 4A-4C are cross-sectional side views of alternative embodiments of permeable portions 26A, 126A; 26B, 126B; 26C, 126C that can be formed using the disclosed laser powder bed fusion method. Permeable portions 26A, 126A; 26B, 126B; 26C, 126C of FIGS. 4A-4C are characterized by dense or non-permeable regions 146A, 146B, 146C, respectively, and permeable regions 148A, 148B, 148C, respectively. FIG. 5 illustrates permeable portion 26A, 126A of FIG. 4A disposed between exterior wall 14, 114 and interior wall 22, 122. The embodiments illustrated in FIGS. 4A-4C and 5 are intended to provide examples of some possible embodiments of permeable portion 26, 126.

Dense regions 146A, 146B, 146C according to the present invention are formed by melting and solidifying selected regions of powder using conventional laser powder bed fusion processing parameters to achieve densities of 99.5% or greater (porosities 0.05% and less). Permeable regions 148A, 148B, 148C are formed by sintering or partially melting powder using an adjusted set of processing parameters providing a lower energy density. In some embodiments, permeable structures 148A, 148B, 148C can be formed using laser powder bed fusion with Inconel 625 or Haynes 282 powder. Inconel 625 and Haynes 282 are nickel-based alloys having similar material properties and respond similarly to the first and second sets of processing parameters. Typical powder sizes for laser bed powder fusion are 15-63 μm. For the selected materials (Inconel 625 and Haynes 282), dense regions 146A, 146B, 146C can formed with a first set of processing parameters providing a first energy density within the range of approximately 890-1500 $J/mm^4$.

Permeable regions 148A, 148B, 148C according to the present invention are formed by sintering or partially melting and solidifying powder to form a porous layer with connected porosity. Connected porosity extends within the layer and with the underlying layer to provide permeability in multiple directions. Permeable regions 148A, 148B, 148C can be formed using a second set of processing parameters providing a second energy density less than the first energy density used for forming dense regions 146A, 146B, 146C. For the selected materials (Inconel 625 and Haynes 282), the second energy density can range from approximately 30-600 $J/mm^4$. The first energy density can be reduced to the second energy density by adjusting any one or combination of processing parameters in the first set of processing parameters (e.g., increasing laser spot size and/or scanning velocity and reducing laser power). For the selected materials, laser spot size can range from approximately 0.16 mm to 0.5 mm, laser power can range from approximately 200 W to 400 W, scan velocity can range from approximately 450 mm/s to 3000 mm/s, hatch spacing can range from approximately 0.18 mm to 0.45 mm, and layer thickness can be approximately 0.3 mm. Layer thickness is uniform for the layer and, therefore, is unchanged between dense regions 146A, 146B, 146C and permeable regions 148A, 148B, 148C. Because full melting is not required, a build time for forming permeable regions 148A, 148B, 148C is less than a build time for forming dense regions 146A, 146B, 146C.

Permeable regions 148A, 148B, 148C formed using the disclosed method can have pores ranging in size from 0.0005 inches to 0.010 inches (0.0127 mm to 0.254 mm), which can accommodate fluid flow through permeable regions 148A, 148B, 148C. Pore size can be determined through metallography or measuring the leakage rate of a fluid with specific properties related to flowability and molecule size. As used herein, pore size is the smallest distance between two walls of a pore, length l (shown in FIG. 6) or smallest dimension. Pore size can be varied by adjusting processing parameters. Depending on the material, a decreased energy density may be used to create a volume of decreased density. The effective porosity, or open volume of surface connected porosity in permeable regions 148A, 148B, 148C as a function of theoretical solid volume, can range from 1 percent to 50 percent. The theoretical solid volume is the theoretical solid volume if the permeable or porous volume was 100 percent solid. The open volume surface connected porosity can be determined using known methods for calculating connected porosity of a porous structure. ASTM B962 provides a method for determining the density of compacted or sintered powder metallurgy products using Archimedes' Principle. Permeable regions 148A, 148B, 148C can be impregnated with oil or other suitable material capable of sealing the pore and the open volume surface connected porosity can be determined by subtracting a sintered density from the impregnated density. The impregnated density is the mass per unit volume of the sintered structure impregnated with oil. The sintered density is the mass per unit volume of the sintered, non-impregnated, structure. The impregnated density and sintered density can be calculated as provided in ASTM B962. Additional unconnected pores can be present, which contribute to the total porosity of the structure, but not permeability.

It will be understood that the disclosed processing parameters are specific to the selected materials (Inconel 625 and Haynes 282) and that application to other materials may not yield the same results. Parameter selection can be made based, at least in part, on process maps constructed for the desired material. Process maps can be used to predict or determine outcomes (e.g., density, pore size, location of pores, etc.) for a build material at varying combinations of beam power and scan velocity, which are generally the most significant process variables for metal additive manufacturing. While process maps are conventionally used to determine the best process variable combination for achieving high density, observed or predicted outcomes in other regions of the P-V plot can guide the selection of process variables that would produce connected porosity. Process maps can be determined analytically and/or empirically according to methods known in the art.

Permeable portions 26A, 126A; 26B, 126B; 26C, 126C can be built layer-by-layer by material deposition in an upward direction along the z-axis. Geometric arrangements can be constrained to limit surface swelling during building and re-coater contact. For example, a maximum continuous permeable region height h can be 0.75 inches (19.05 mm) and a maximum permeable region channel width w can be 0.75 inches (19.05 mm). A minimum thickness for dense regions is 0.001 inches (0.0254 mm). Each powder layer can have a thickness ranging from 0.00005 inches (0.00127 mm) to 0.050 inches (1.27 mm). Permeable portions 26A, 126A; 26B, 126B; 26C, 126C can be formed as integral sections of varying dimensions and geometries in pressure vessel 10 and the heat exchanger of FIG. 2B.

A methodology for selecting the geometries of the dense and permeable regions is generally based on the shape of the part, orientation for build, associated local thicknesses, areas of high stress, and any geometry concerns related to fluid or thermal performance. The arrangements of dense regions 146A, 146B, 146C in FIGS. 4A, 4B, 4C, respectively, represent different solid support structures within permeable portion 26, 126 to accommodate varying needs for stiffness and permeability.

FIG. 4A is a cross-sectional side view of permeable portion 26A, 126A. Permeable portion 26A, 126A is characterized by dense regions 146A, which extend in non-connecting and overlapping horizontal bands that separate permeable portion 26A, 126A into maze-like flow paths. Segmented or non-connecting horizontal bands can be provided across a surface in multiple layers and can be arranged to overlap with gaps formed between horizontal bands of an underlying layer such that a maximum height h of permeable region 148A in any location is not greater than 0.75 inches (19.05 mm). The thickness of dense regions 146A can vary from the embodiment illustrated. A minimum thickness of dense regions 146A in the illustrated embodiment is 0.001 inches (0.0254 mm). The height of permeable regions 148A and geometric configuration of dense regions 146A provides through-component permeability while limiting surface swelling during building and re-coater contact.

FIG. 4B is a cross-sectional side view of permeable portion 26B, 126B. Permeable portion 26B, 126B is characterized by a plurality of diamond-shaped dense regions 146B surrounded and separated by permeable region 148B. As illustrated in FIG. 4B, diamond-shaped dense regions 146B can be arranged in rows, which can be offset from adjacent rows. Permeable region 148B provides interconnected permeable channels through permeable portion 26B, 126B. The shapes of the dense regions 146B can vary from the embodiment illustrated.

FIG. 4C is a cross-sectional side view of permeable portion 26C, 126C. Permeable portion 26C, 126C is characterized by a plurality of dense regions 146C defined by slanted, non-connecting bands, which are surrounded by permeable region 148C. Dense regions 146C can be arranged in slanted parallel rows of uniform spacing to provide channels of permeability between adjacent dense regions 146C and rows of dense regions 146C. The orientation of dense regions 146C can vary from the embodiment illustrated.

Permeable portion 26B, 126B can be used to provide high stiffness. As illustrated in FIG. 4B, dense regions 146B make up a larger portion of the total volume than permeable regions 148B. Permeable portions 26A, 126A and 26C, 126C can be used to provide high permeability. As illustrated in FIGS. 4A and 4C, permeable regions 148A and 148C make up a larger portion of total volume of permeable portion 26A, 126A and 26C, 126C, respectively, than dense regions 146A and 146C.

FIG. 5 illustrates permeable portion 26A, 126A of FIG. 4A disposed between exterior wall 14, 114 and interior wall 22, 122 of pressure vessel 10 and the heat exchanger of FIG. 3. A thickness t of permeable portion 26A, 126A can be equal to the diameter of the laser beam. Dense regions 146A can extend from exterior wall 14, 114 to interior wall 22, 122 thereby connecting exterior wall 14, 114 to interior wall 22, 122. Dense regions 22, 122 can extend orthogonally from exterior wall 14, 114 and interior wall 22, 122. Permeable region 148A extends from exterior wall 14, 114 to interior wall 22, 122 thereby connecting exterior wall 14, 114 to interior wall 22, 122. Permeable region 148A fills the space between dense regions 146A and is connected to each dense region 146A. Both dense regions 146A and permeable regions 148A provide a pathways for thermal conduction between exterior wall 14, 114 and interior wall 22, 122.

FIG. 6 is an enlarged cross-sectional representation of any of permeable regions 148A-148C illustrated in FIGS. 4A-4C. FIG. 6 illustrates interconnected pores 150. As previously discussed, interconnected pores can have a pore size within a range of 0.0005 inches (0.0127 mm) to 0.010 inches (0.254 mm) to accommodate fluid flow through permeable regions 148A, 148B, 148C. The effective porosity, or open volume of surface connected porosity in permeable regions 148A, 148B, 148C as a function of theoretical solid volume, can range from 1 percent to 50 percent. Permeable sections can also include closed pores 152 and dead-end pores 154, which contribute to the porosity of the region, but not permeability.

Permeable portion 26, 126 can have a sufficient density and structural integrity to allow permeable portion 26, 126 to act as a structural load carrying member and can have sufficient permeability to allow permeable portion 26, 126 to effectively conduct fluid from leakage to a collection point. The incorporation of permeable portion 26, 126 can reduce overall build time for a component, reduce overall size of the component, improve heat transfer, and improve strength. Powder is consumed in the formation of permeable portion 26, 126 thereby eliminating the need to remove powder from small passages. The integral manufacture of permeable portion 26, 126 with exterior wall 14, 114 and interior can reduce leakage pathways by eliminating the need for braze or weld joints. Geometries of permeable portion 26, 126 can be contoured and conformal, developed to meet packaging needs and optimized based on structural loading requirements. Permeable portion 26, 126 can be carried or transitioned through associated piping and headers without added weight and complexity of multiple components. Dimensions of permeable portion 26, 126 can be varied depending on required flow or pressure in specific locations. Permeable portion 26, 126 provides a thermal conduction path that is improved over conventional air gap barrier layers as well as some barrier layers with structural supports. Although specific embodiments have been disclosed, it will be understood by one of ordinary skill in the art that the design of permeable portion 26, 126 is application to all pressure vessels, including tanks, piping, and heat exchangers requiring a barrier passage for safety.

Discussion of Possible Embodiments

The following are non-exclusive descriptions of possible embodiments of the present invention.

A vessel includes first and second portions that are non-permeable to a fluid and a third portion that is permeable to fluid. The first potion defines at least one exterior wall defining an exterior container. The second portion defines at least one interior wall defining an interior container encapsulated by the exterior container. The third portion is positioned between the at least one exterior wall and the at least one interior wall, is integrally formed with the first portion and the second portion, and has a porous structure with non-uniform connected porosity.

The vessel of the preceding paragraph can optionally include, additionally and/or alternatively, any one or more of the following features and/or configurations:

A further embodiment of the foregoing vessel, wherein the vessel is a heat exchanger that includes a plurality of sections disposed in a stacked arrangement, wherein each section comprises a portion of the interior container and a portion of the exterior container.

A further embodiment of any of the foregoing vessels, wherein the third portion is configured to transfer thermal energy between the exterior wall and the interior wall.

A further embodiment of any of the foregoing vessels, wherein the third portion is configured to transfer vibrational loads between the exterior wall and the interior wall. A further embodiment of any of the foregoing vessels, wherein the third portion forms a flow path envelope surrounding the interior container. A further embodiment of any of the foregoing vessels, wherein the third portion is in fluid communication with a drain port of the vessel.

A further embodiment of any of the foregoing vessels, wherein the third portion has a thickness extending from the exterior wall to the interior wall approximately equal to a laser diameter used to form the third portion.

A further embodiment of any of the foregoing vessels, wherein the third portion comprises a plurality of dense regions having a porosity of less than 0.5 percent.

A further embodiment of any of the foregoing vessels, wherein dense regions of the plurality of dense regions are arranged in a pattern.

A further embodiment of any of the foregoing vessels, wherein the dense regions are disposed orthogonally to the exterior wall and the interior wall.

A further embodiment of any of the foregoing vessels, wherein the dense regions are rectangular in shape.

A heat exchanger includes an exterior container formed by an exterior wall, an interior container formed by an interior wall with the interior container being disposed within the exterior container such that the exterior container encapsulates the interior container, a plurality of sections disposed in a stacked arrangement with each section including a portion of the interior container and a portion of the exterior container, and a permeable portion disposed between and formed integrally with the exterior wall and the interior wall. The permeable portion has a porous structure having non-uniform connected porosity.

The heat exchanger of the preceding paragraph can optionally include, additionally and/or alternatively, any one or more of the following features and/or configurations:

A further embodiment of the foregoing heat exchanger that further includes a plurality of connections extending between sections of the plurality of sections and a drain port disposed in the exterior container, wherein each connection of the plurality of connections fluidly connects adjacent sections of the plurality of sections and wherein the drain port is in fluid communication with the plurality of connections and with the permeable portion.

A further embodiment of any of the foregoing heat exchangers, wherein the permeable portion has a thickness extending from the exterior wall to the interior wall approximately equal to a laser diameter used to form the permeable portion. A further embodiment of any of the foregoing heat exchangers, wherein the permeable portion comprises a plurality of dense regions having a porosity of less than 0.5 percent. A further embodiment of any of the foregoing heat exchangers, wherein dense regions of the plurality of dense regions are arranged in a pattern.

A method of additively manufacturing a vessel having a permeable portion includes forming a first wall defining an exterior container, forming a second wall spaced apart from the first wall and defining an interior container such that the interior container is encapsulated by the exterior container, and forming a permeable portion disposed between and connecting the first and second walls. Forming the permeable portion includes fusing powdered material by melting and solidifying the powdered material in a plurality of first regions to provide dense non-permeable first regions, and fusing powdered material by sintering the powdered material in a second region surrounding and connected to the plurality of first regions to provide a porous second region having an open volume of surface connected porosity between 1 percent and 50 percent and providing fluid permeability in multiple directions.

The method of the preceding paragraph can optionally include, additionally and/or alternatively, any one or more of the following features, and/or steps:

A further embodiment of the foregoing method wherein the dense, non-permeable regions have a total porosity of less than 0.5 percent, and wherein the dense, non-permeable regions are arranged in a pattern.

A further embodiment of any of the foregoing methods that includes providing the dense first regions in a pattern.

A further embodiment of any of the foregoing methods that further includes providing the dense first regions such that the dense first regions are disposed orthogonally to the first and second walls and wherein at least one of the dense first regions is directly connected to at least one of the first and second walls.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A vessel comprising:
   a first portion that is non-permeable to a fluid, the first potion defining at least one exterior wall defining an exterior container;
   a second portion that is non-permeable to the fluid, the second portion defining at least one interior wall defining an interior container encapsulated by the exterior container; and
   a third portion that is permeable to the fluid, the third portion being positioned between the at least one exterior wall and the at least one interior wall and having a thickness extending from the exterior wall to the interior wall approximately equal to a laser diameter used to form the third portion, the third portion being integrally formed with the first portion and the second portion and comprising a porous structure with non-uniform connected porosity
   wherein the porous structure comprises a plurality of dense regions having a porosity of less than 0.5 percent.

2. The vessel of claim 1, wherein the vessel is a heat exchanger comprising a plurality of sections disposed in a stacked arrangement, wherein each section comprises a portion of the interior container and a portion of the exterior container.

3. The vessel of claim 1, wherein the third portion is configured to transfer thermal energy between the exterior wall and the interior wall.

4. The vessel of claim 1, wherein the third portion is configured to transfer vibrational loads between the exterior wall and the interior wall.

5. The vessel of claim 1, wherein the third portion forms a flow path envelope surrounding the interior container.

6. The vessel of claim 1, wherein the third portion is in fluid communication with a drain port of the vessel.

7. The vessel of claim 1, wherein dense regions of the plurality of dense regions are arranged in a pattern.

8. The vessel of claim 7, wherein the dense regions are disposed orthogonally to the exterior wall and the interior wall.

9. The vessel of claim 8, wherein the dense regions are rectangular in shape.

10. The vessel of claim 1, wherein the third portion comprises fused powder particles.

11. A heat exchanger comprising:
    an exterior container formed by an exterior wall that is non-permeable to a fluid;
    an interior container formed by an interior wall that is non-permeable to a fluid, wherein the interior container is disposed within the exterior container such that the exterior container encapsulates the interior container;
    a plurality of sections disposed in a stacked arrangement, wherein each section comprises a portion of the interior container and a portion of the exterior container; and
    a permeable portion disposed between and formed integrally with the exterior wall and the interior wall and having a thickness extending from the exterior wall to the interior wall approximately equal to a laser diameter used to form the permeable portion, wherein the permeable portion comprises a porous structure having non-uniform connected porosity;
    wherein the permeable portion comprises a plurality of dense regions having a porosity of less than 0.5 percent.

12. The heat exchanger of claim 11, and further comprising:
    a plurality of connections extending between sections of the plurality of sections, wherein each connection of the plurality of connections fluidly connects adjacent sections of the plurality of sections; and
    a drain port disposed in the exterior container, wherein the drain port is in fluid communication with the plurality of connections and with the permeable portion.

13. The pressure vessel of claim 11, wherein dense regions of the plurality of dense regions are arranged in a pattern.

14. The heat exchanger of claim 11, wherein the permeable portion comprises fused powder particles.

* * * * *